United States Patent [19]
Wu

[11] Patent Number: 5,573,211
[45] Date of Patent: *Nov. 12, 1996

[54] STRUCTURE OF GOLF BAG CRADLE ASSEMBLY

[76] Inventor: Ching-Chang Wu, No. 35-1, Jih Hsin Street, Tu Cheng Hsiang, Taiepi Hsien, Taiwan

[ * ] Notice: The term of this patent shall not extend beyond the expiration date of Pat. No. 5,465,930.

[21] Appl. No.: 354,727

[22] Filed: Dec. 6, 1994

Related U.S. Application Data

[63] Continuation-in-part of Ser. No. 216,318, Mar. 23, 1994, Pat. No. 5,465,930.

[51] Int. Cl.⁶ .................................................. A63B 55/00
[52] U.S. Cl. .......................................... 248/96; 248/230.8
[58] Field of Search ..................................... 248/96, 311.2, 248/313, 230.8; 403/289, 341; 24/68 R

[56] References Cited

U.S. PATENT DOCUMENTS

| 1,758,005 | 5/1930 | Mangold | 248/230.8 |
| 3,079,166 | 2/1963 | Abgarian | 248/96 X |
| 3,610,559 | 10/1971 | Leitzel | 248/96 |
| 5,465,930 | 11/1995 | Wu | 248/96 |

Primary Examiner—Ramon O. Ramirez
Assistant Examiner—Derek J. Berger
Attorney, Agent, or Firm—Varndell Legal Group

[57] ABSTRACT

A golf bag cradle assembly including a bag cradle, and two straps for fastening a golf bag to the bag cradle, each strap having a loop at one end fastened to the bag cradle and a male or female strap connector at an opposite end for connection to each other, wherein the two straps have a respective elastic strap section in the middle respectively connected between the loops and the male and female strap connectors to absorb shocks.

1 Claim, 3 Drawing Sheets

STRUCTURE OF GOLF BAG CRADLE ASSEMBLY

CROSS-REFERENCE TO RELATED APPLICATION

The present invention is a continuation-in-part of patent application Ser. No. 08/216,318 filed on Mar. 23, 1994, now U.S. Pat. No. 5,465,930.

FIG. 1 shows a regular golf cart having a bag cradle with two cradle straps for fastening a golf bag. One cradle strap has a strap section mounted with a male strap connector for connection to a female strap connector on the other cradle strap. The drawback of this structure of golf bag cradle assembly is that the male strap connector tends to slip on the strap section when the golf cart is moved over a rugged road surface and vibrated. If the male strap connector slips on the strap section, the golf bag will displace from the golf bag cradle. U.S. patent application Ser. No. 08/216,318, now U.S. Pat. No. 5,465,930 discloses a golf bag cradle assembly for holding a golf bag. This structure of golf bag cradle assembly still can not eliminate the aforesaid problem.

SUMMARY OF THE INVENTION

The present invention has been accomplished to provide a golf bag cradle assembly which eliminates the aforesaid problem. According to the present invention, the golf bag cradle assembly comprises a bag cradle, and two straps for fastening a golf bag to the bag cradle. Each strap has a loop at one end fastened to the bag cradle and a male or female strap connector at an opposite end for connection to each other. The two straps have a respective elastic strap section in the middle respectively connected between the loops and the male and female strap connector. When the golf cart is moved over an uneven road, the elastic strap sections will be stretched and released, and therefore shocks can be absorbed and, the male strap connector will not slip.

DETAILED DESCRIPTION OF THE PREFERRED EMBODIMENT

Figure 1:
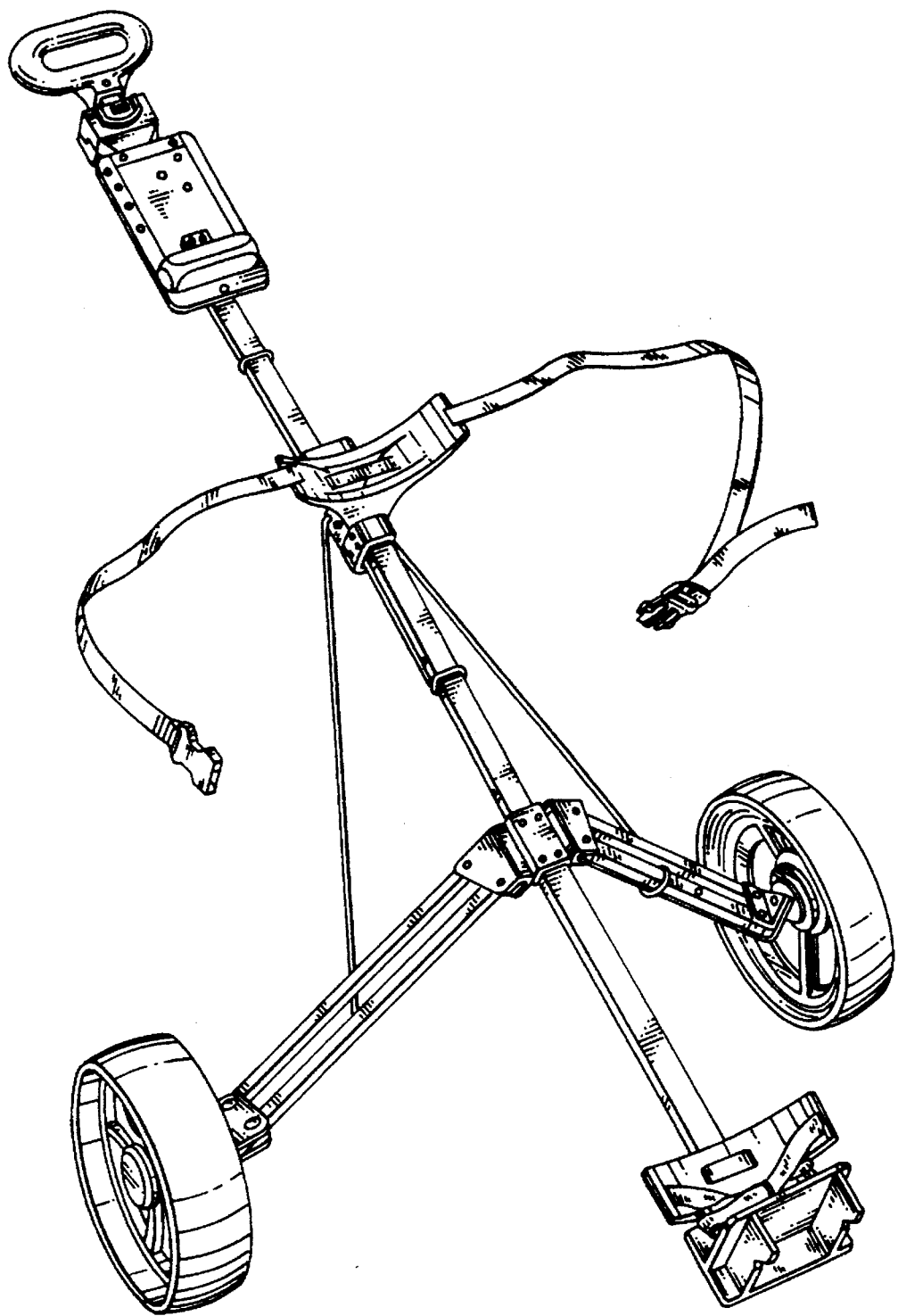
FIG. 1 is an elevational view of a golf cart having golf bag cradles made according to the prior art.
Figure 2:
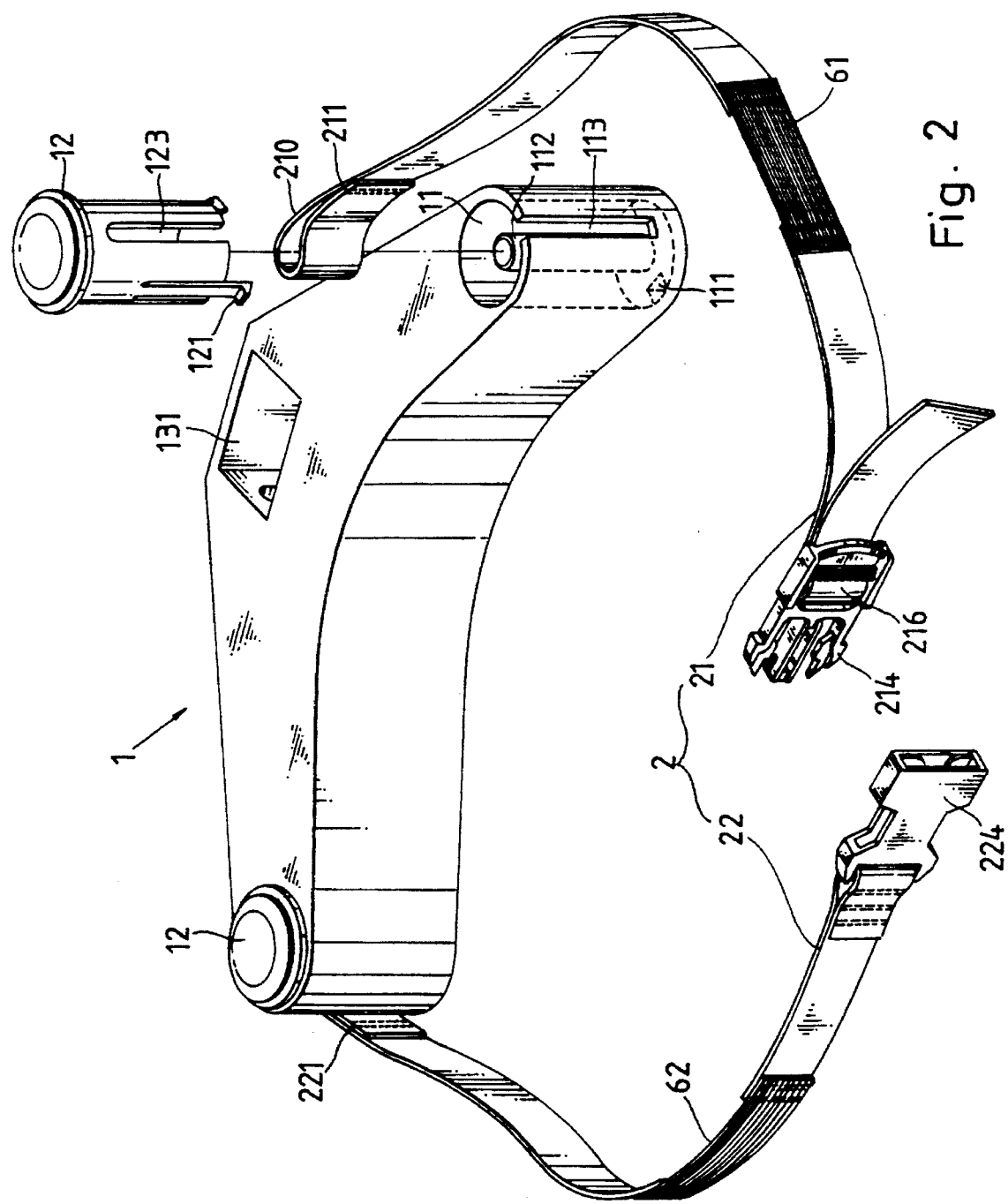
FIG. 2 is an exploded view of a golf bag cradle assembly according to the preferred embodiment of the present invention.
Figure 3:
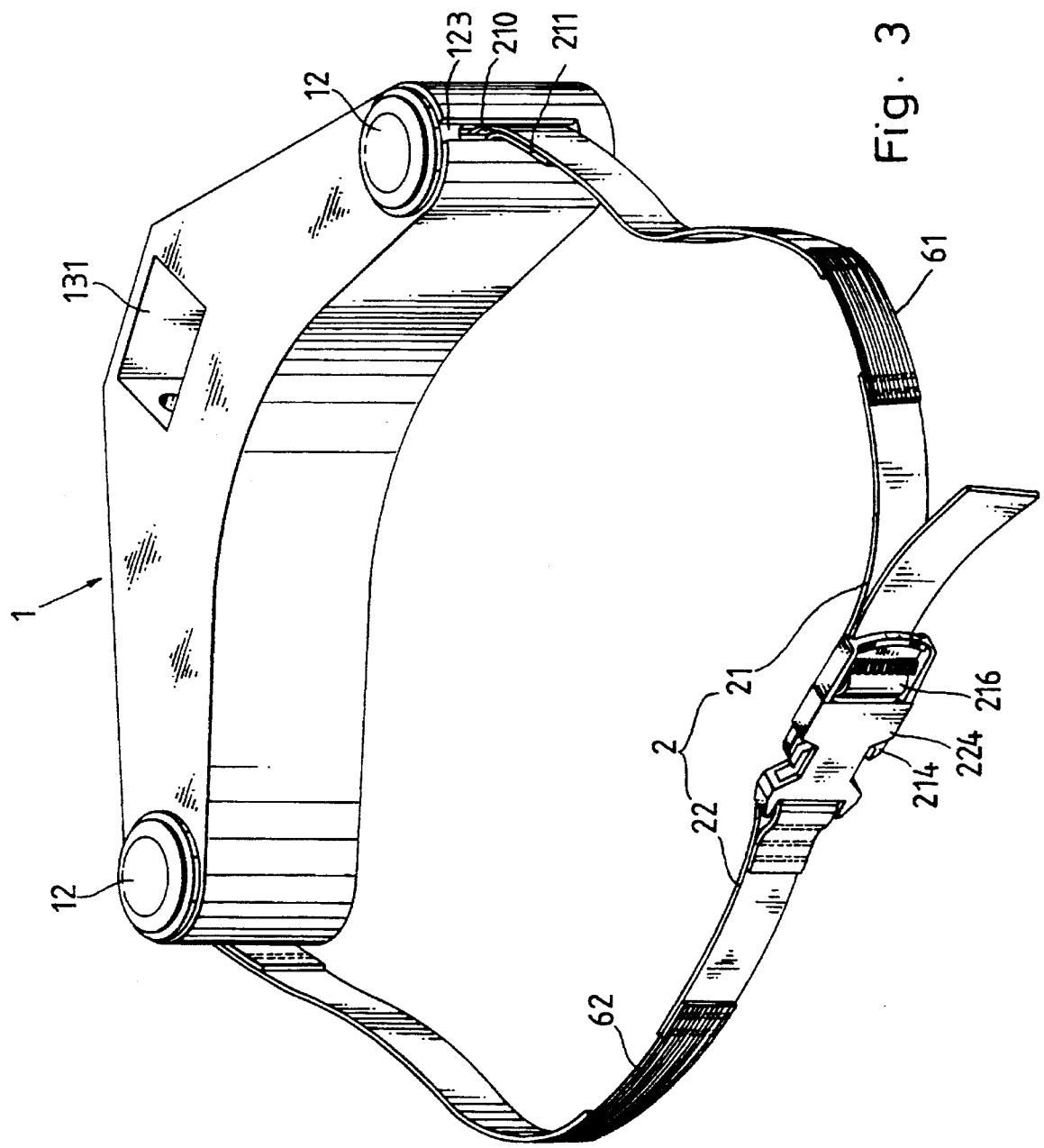
FIG. 3 shows the cradle straps of the golf bag cradle assembly of FIG. 2 fastened up.

Referring to FIGS. 2 and 3, a golf bag cradle, referenced by 1, comprises a mounting through hole 131 in the middle, which receives the frame member of the golf cart, a screw hole on the back (not shown), into which a tightening up screw (not shown) is threaded and stopped against the frame member of the golf cart to fax the upper bag cradle to the frame member of the golf cart, two recessed, cylindrical strap mounting holes 11 disposed on two opposite ends thereof in the axial direction in parallel with the frame member of the golf cart, and two hollow, cylindrical plug caps 12 respectively fastened to the strap mounting holes 11 to hold a cradle strap 2. The strap mounting hole 11 at either end of the golf bag cradle 1 comprises an elongated side slot 113 extended through the peripheral wall of the golf bag cradle 1 to the outside, an upright post 112 raised from the bottom on the inside in the center, and a retaining hole 111 on the bottom spaced from the upright post 112. The hollow, cylindrical plug cap 12 comprises a hook 121 at the bottom hooked in the retaining hole 111 inside either strap mounting hole 11, a side slot 123 disposed in parallel with the elongated side slot 113. The cradle strap 2 is comprised of a first strap 21 and a second strap 22.

The first and second straps 21 and 22 each has one end 211 or 221 terminating in a loop 210, which is mounted around the upright post 112 in one strap mounting hole 11, and an opposite end extended out of the respective plug cap 12 and the golf bag cradle 1 through the respective side slots 123 and 113 and coupled with a male strap connector 214 or female strap connector 224. When the golf bag is placed on the golf bag cradle 1, the male and female strap connectors 214 and 224 of the first and second straps 21 and 22 of the cradle strap 2 are fastened together to hold down the golf bag.

Referring to FIGS. 2 and 3 again, the first strap 21 has an elastic strap section 61 in the middle between the loop 210 and the male strap connector 214. Similarly, the second strap 22 has an elastic strap section 62 in the middle between the loop and the female strap connector 224. The elastic strap sections 61 and 62 are made from elastic bands. Because the elastic strap sections 61 and 62 can be stretched, shocks from the golf bag cradle 1 can be absorbed, and therefore the male strap connector 214 does not slip on the strap section 216 of the first strap 21 to which the male strap connector 214 is fastened.

I claim:

1. A golf bag cradle assembly for a golf cart of the type comprising a bag cradle having two upright posts in two recessed holes thereof and two side slots on two opposite ends thereof respectively communicated with said recessed holes, a first strap, a second strap, said first and second straps having each one end terminating in a loop respectively mounted on said upright posts and an opposite end connected to each other by a male strap connector and a female strap connector to hold down a golf bag on said bag cradle, and two plug caps respectively fastened to said recessed holes by hooks to hold the loops of said first and second straps in place, wherein said first and second straps have a respective eleastic strap section in the middle respectively connected between the loops of said first and second straps and said male and female strap connector.

* * * * *